United States Patent [19]

Giachino et al.

[11] 4,277,814
[45] Jul. 7, 1981

[54] SEMICONDUCTOR VARIABLE CAPACITANCE PRESSURE TRANSDUCER ASSEMBLY

[75] Inventors: Joseph M. Giachino, Farmington Hills; Russell J. Haeberle, Canton; Joseph W. Crow, Livonia, all of Mich.

[73] Assignee: Ford Motor Company, Dearborn, Mich.

[21] Appl. No.: 72,503

[22] Filed: Sep. 4, 1979

[51] Int. Cl.$^3$ ............................................. H01G 5/00
[52] U.S. Cl. ............................... 361/283; 73/724; 361/405
[58] Field of Search ............... 361/283, 405; 73/718, 73/724; 357/26

[56] References Cited

U.S. PATENT DOCUMENTS

| | | | |
|---|---|---|---|
| 3,456,159 | 7/1969 | Davis | 361/405 X |
| 3,619,742 | 11/1971 | Rud | 361/283 |
| 3,748,571 | 7/1973 | Kurtz | 361/283 |
| 3,780,352 | 12/1973 | Redwanz | 361/405 X |
| 3,808,480 | 4/1974 | Johnston | 361/283 |
| 3,858,097 | 12/1974 | Polye | 361/283 |
| 4,128,006 | 12/1978 | Grabow | 73/724 |

OTHER PUBLICATIONS

Marx, "First Production Automotive Capacitive Pressure Sensor", in Measurements & Contol 6/78, pp. 114-117.

*Primary Examiner*—E. A. Goldberg
*Attorney, Agent, or Firm*—Peter Abolins; Clifford L. Sadler

[57] ABSTRACT

A capacitive pressure transducer assembly having a semiconductor transducer device, a substrate, and a cover for use in conducting a fluid pressure to be sensed to the exterior surfaces of the transducer device. The transducer device may have a glass, silicon or other nonconductive material as a base on which a metal capacitor plate is formed. The other capacitor plate may be formed of doped silicon or other semiconductor material. Also, the substrate on which the transducer device is mounted may have additional and related circuitry implemented in thick film technology (ceramic substrate) or integrated circuit technology (semiconductor substrate).

7 Claims, 3 Drawing Figures

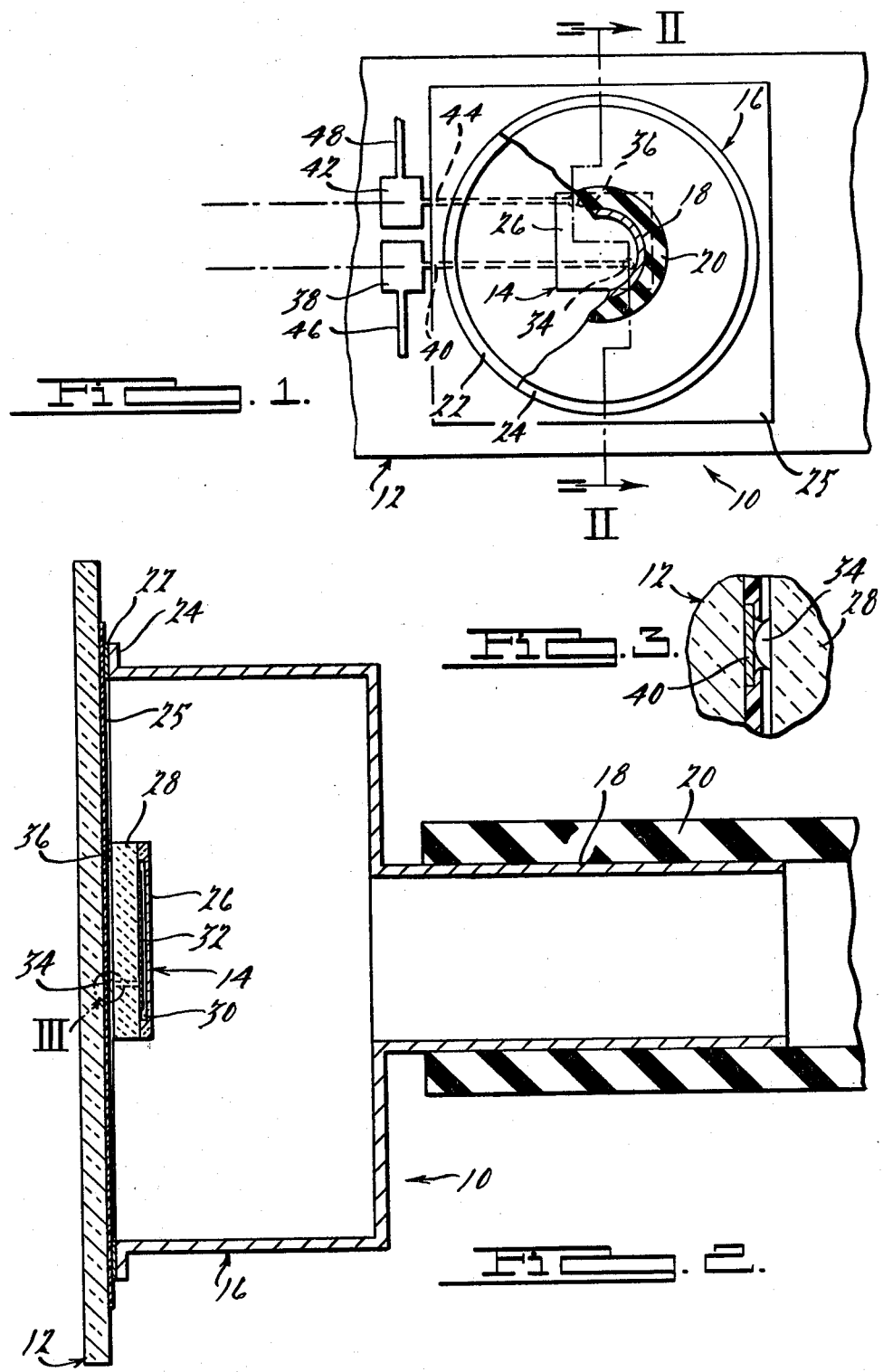

SEMICONDUCTOR VARIABLE CAPACITANCE PRESSURE TRANSDUCER ASSEMBLY

CROSS-REFERENCE TO RELATED APPLICATIONS

This invention is related to our concurrently filed and commonly-assigned patent applications Ser. No. 72,536 entitled "SEMICONDUCTOR VARIABLE CAPACITANCE PRESSURE TRANSDUCER" and Ser. No. 72,506 entitled "METHOD FOR MANUFACTURING VARIABLE CAPACITANCE PRESSURE TRANSDUCERS AND AN INTERMEDIATE ARTICLE OF MANUFACTURE PRODUCED THEREBY".

BACKGROUND

This invention relates to an improved variable capacitance pressure transducer assembly of the type which has a capacitance pressure transducer device comprising at least two spaced conductive plates subject to variation in the spacing between the plates, and resultant variation of the electrical capacitance between the plates, in response to fluctuations in fluid pressure acting on at least one of the plates.

The pressure transducer assembly is particularly suitable for use in measuring absolute pressure, such as that which occurs in the intake manifold of an internal combustion engine where the pressure measurement is required to provide air flow information in relation to metering of fuel to the engine. The pressure transducer also is very satisfactory for use in measurement of barometric pressure.

SUMMARY OF THE INVENTION

The improved variable capacitance pressure transducer assembly of the present invention is of the type that has a capacitive pressure transducer device that comprises at least two spaced conductive plates. The spaced conductive plates are subject to variation in their spacing, and resultant variation of the electrical capacitance between the plates in response to fluctuations in fluid pressure acting on at least one of the plates. The transducer assembly is characterized by a dielectric substrate which is of electrically insulating character and which has electrically conductive strips thereon. The pressure transducer device has conductive bumps on one of its surfaces, the conductive bumps being attached to the conductive strips on the substrate. In the preferred form of the invention, the dielectric substrate is ceramic, preferably alumina. The pressure transducer device may comprise a semiconductor material that forms one of the conductive plates of the transducer device and a dielectric material having a first surface bonded to the semiconductor material. The first surface has a conductive material on it and forms another of the conductive plates of the pressure transducer device. The dielectric material has a second surface on which the conductive bumps are located.

These and other features of the invention may be better understood by reference to the detailed description which follows and to the drawings.

BRIEF DESCRIPTION OF THE DRAWINGS

FIG. 1 is an enlarged plan view, at approximately three times its actual size of the improved variable capacitance pressure transducer assembly of the invention; and FIG. 2 is a further enlarged view, approximately six times actual size, of the pressure transducer assembly of FIG. 1 and is shown in sectional elevational view, the section being taken along the line II—II in FIG. 1; and FIG. 3 is an even further enlarged partial sectional view of the area in circle III of FIG. 2.

DETAILED DESCRIPTION

With particular reference now to the drawings, wherein like numerals refer to like parts in the two figures thereof, there is shown an improved variable capacitance pressure transducer assembly generally designated by the numeral 10.

The pressure transducer assembly 10 comprises three main elements, a dielectric substrate 12, a pressure transducer device 14, and a cover 16 having a tubular extension 18 to which a rubber tube 20 or the like may be affixed for supplying pressure to the region enclosed by the cover 16. The upper surface of the pressure transducer device 14 is subjected to fluid pressures within the cover 16 and deflects upwardly or downwardly in response to such pressure fluctuations to vary the capacitance between two plates of a capacitor that are an integral part of the pressure transducer device 14.

The substrate 12 preferably is made of an alumina ceramic or other electrical insulating material. Alumina is a material commonly used in electronic thick-film technology and is commercially available in various sizes. Silicon or other semiconductor material may be used as the substrate 12 if desired and integrated circuit technology may be employed therewith in the use of the pressure transducer signal. If instead thick film technology is used, the substrate 12 may be made of beryllia, a considerably more expensive material than alumina but satisfactory for this application if desired. The pressure transducer device 14 preferably is constructed in accordance with the teachings of the cross-referenced patent applications mentioned previously, and it is suggested that reference be made thereto for a better understanding of the utilization of the device 14. This device, however, does include a semiconductor material 26 that is heavily doped and forms one plate of a capacitor in the transducer device. The semiconductor material 26 is bonded, preferably anodically, to a glass or other insulating material 28 on which a thin film 32 of electrically conductive material has been deposited to form a second plate of the pressure transducer capacitor. The spacing between the semiconductor material 26 and the thin film of conductive material 32 varies as a function of fluctuations of fluid pressure to which the semiconductor material is exposed on its exterior surface within the cover 16. The fluid pressure within the recessed area or volume 30 of the pressure transducer device 14 may be maintained at a constant level as a result of the establishment therein of vacuum or other predetermined pressure during manufacture of the transducer device 14.

The transducer device 14 has solder bumps 34 and 36 that are electrically connected, respectively, to the thin film capacitor plate 32 and the semiconductive material 26 capacitor plate. Additional solder bumps may be provided for mechanical stability of the transducer device 14, which is both electrically and mechanically connected to the substrate 12. The substrate 12 has conductive leads 40 and 42, as may best be seen in FIG.

1, to which the solder bumps 34 and 36, respectively, are electrically connected.

The conductive strips 40 and 44 provide electrical connection to the capacitor plates through the solder bumps and the internal conductive paths within the pressure transducer device 14. These conductive leads 40 and 42 extend out of the flange parameter 24 of the cover 16 where they connect with conductive pads 38 and 42, respectively. These pads 38 and 42 have respective electrically conductive leads 46 and 48 that may connect to external circuitry remote from the substrate 12 or to thick film and other electronic components that may be located on the substrate 12 using known thick film electrical technology. The capacitive pressure transducer of the invention may have electrical capacitance variations that can be used to control the output frequency or voltage of an oscillator and/or other electronic circuitry intended to indicate pressure in response to the capacitance fluctuations.

The flange or parameter 24 of the cover 16 is bonded to the substrate, via an intermediate bonding material 22, in a manner that prohibits entry of fluids into the volume enclosed by the cover 16 and the substrate 12 via this flange area 24. Thus, as a result of this closed-path seal, fluid pressure within the cover 16 is established through the tube extension 18, which may be connected for example to the intake manifold of an internal combustion engine. This fluid pressure to be measured applied to the external area of the pressure transducer device 14, thereby, to allow any pressure variations of the pressure being sensed to produce deflection of the transducer area and consequential variation of its electrical capacitance. The flange 24 and the intermediate bonding material 22 do not make electrical contact with the conductive leads 40 and 44 which pass thereunder. An oxide 25 or other electrical insulating material may be used to separate the conductive leads 40 and 44 from the flange 24 and the intermediate bonding material 22 if necessary. Of course, the bonding material 22 may be non-conductive and may be a resinous material. Solder also could be used.

Based upon the foregoing description of the invention, what is claimed is:

1. An improved variable capacitance pressure transducer assembly of the type which has a capacitive pressure transducer device comprising at least two spaced conductive plates subject to variation in the spacing between the plates, and resultant variation of the electrical capacitance between the plates, in response to fluctuations in fluid pressure acting on at least one of the plates, characterized by:
   (a) a substrate, the substrate having electrically conductive strips thereon; and
   (b) the pressure transducer device has conductive bumps on one of its surfaces, the conductive pumps being attached to the conductive strips of the substrate;

wherein the transducer assembly includes a cover surrounding the capacitive pressure transducer device, the cover being bonded to the substrate with a closed-path seal which crosses the conductive strips on the substrate without electrical contact to such conductive strips.

2. An improved transducer assembly according to claim 1 wherein the substrate is ceramic.

3. An improved transducer assembly according to claim 1 wherein the substrate is a semiconductive material.

4. An improved transducer assembly according to claim 1 wherein the capacitive pressure transducer device comprises a semiconductor material forming one of the conductive plates of the transducer device and a dielectric material having a first surface bonded to the semiconductor material and having a conductive material thereon forming another of the conductive plates of the transducer device, the dielectric material having a second surface on which the conductive bumps are located.

5. An improved transducer assembly according to claim 3 wherein the substrate is ceramic.

6. An improved variable capacitance pressure transducer assembly of the type which has a capacitive pressure transducer device comprising at least two spaced conductive plates subject to variation in the spacing between the plates, and resultant variation of the electrical capacitance between the plates, in response to fluctuations in fluid pressure acting on at least one of the plates, characterized by:
   (a) a substrate, the substrate having electrically conductive strips thereon; and
   (b) the pressure transducer device has conductive bumps on one of its surfaces, the conductive bumps being attached to the conductive strips on the substrate;

wherein the transducer assembly includes a cover surrounding the capacitive pressure transducer device, the conductive strips on the substrate extending outside of the cover, the substrate having thereon additional conductive paths connected with the conductive strips extending outside of the cover.

7. An improved transducer assembly according to claim 6 wherein the volume between the capacitor plates of the pressure transducer device is closed and at a predetermined pressure and wherein the cover includes conduit means extending therefrom for allowing fluid pressure to be measured to be applied to the pressure transducer device on an external area thereof, thereby, to permit the fluid pressure to be measured to produce deflection of the area of the pressure transducer device subjected to such fluid pressure.

* * * * *